Feb. 12, 1935.    H. B. HYAMS    1,991,217
GOODS DISPLAY DEVICE
Filed June 22, 1931    4 Sheets-Sheet 1

Inventor
HERBERT B. HYAMS
By [signature]
ATTORNEYS

Feb. 12, 1935.  H. B. HYAMS  1,991,217
GOODS DISPLAY DEVICE
Filed June 22, 1931  4 Sheets-Sheet 2

Inventor
HERBERT B. HYAMS
By
ATTORNEYS

Feb. 12, 1935.  H. B. HYAMS  1,991,217
GOODS DISPLAY DEVICE
Filed June 22, 1931  4 Sheets-Sheet 3
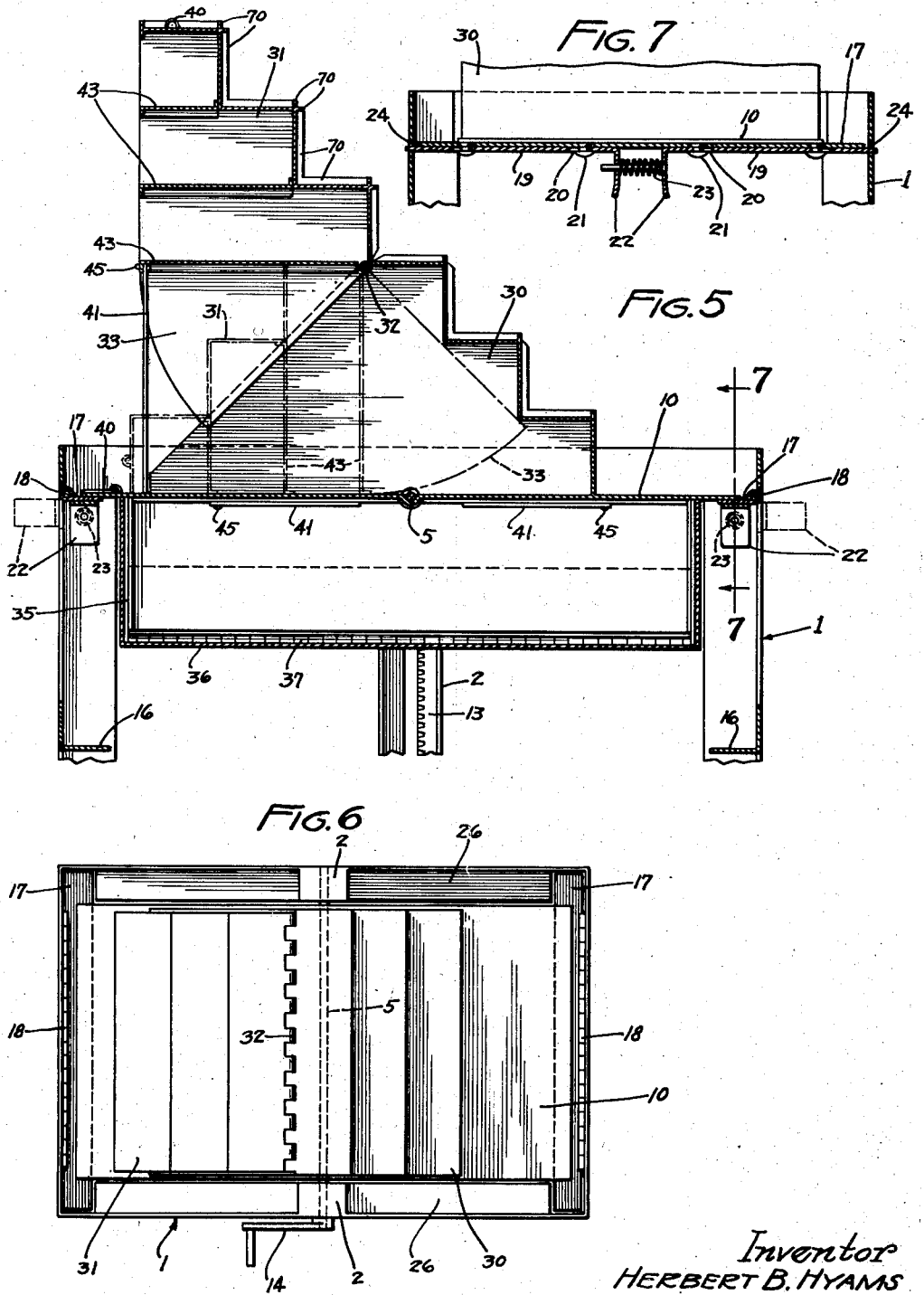
Inventor
HERBERT B. HYAMS
By Paul, Paul Moore
ATTORNEYS Feb. 12, 1935.　　　　H. B. HYAMS　　　　1,991,217
GOODS DISPLAY DEVICE
Filed June 22, 1931　　　　4 Sheets-Sheet 4
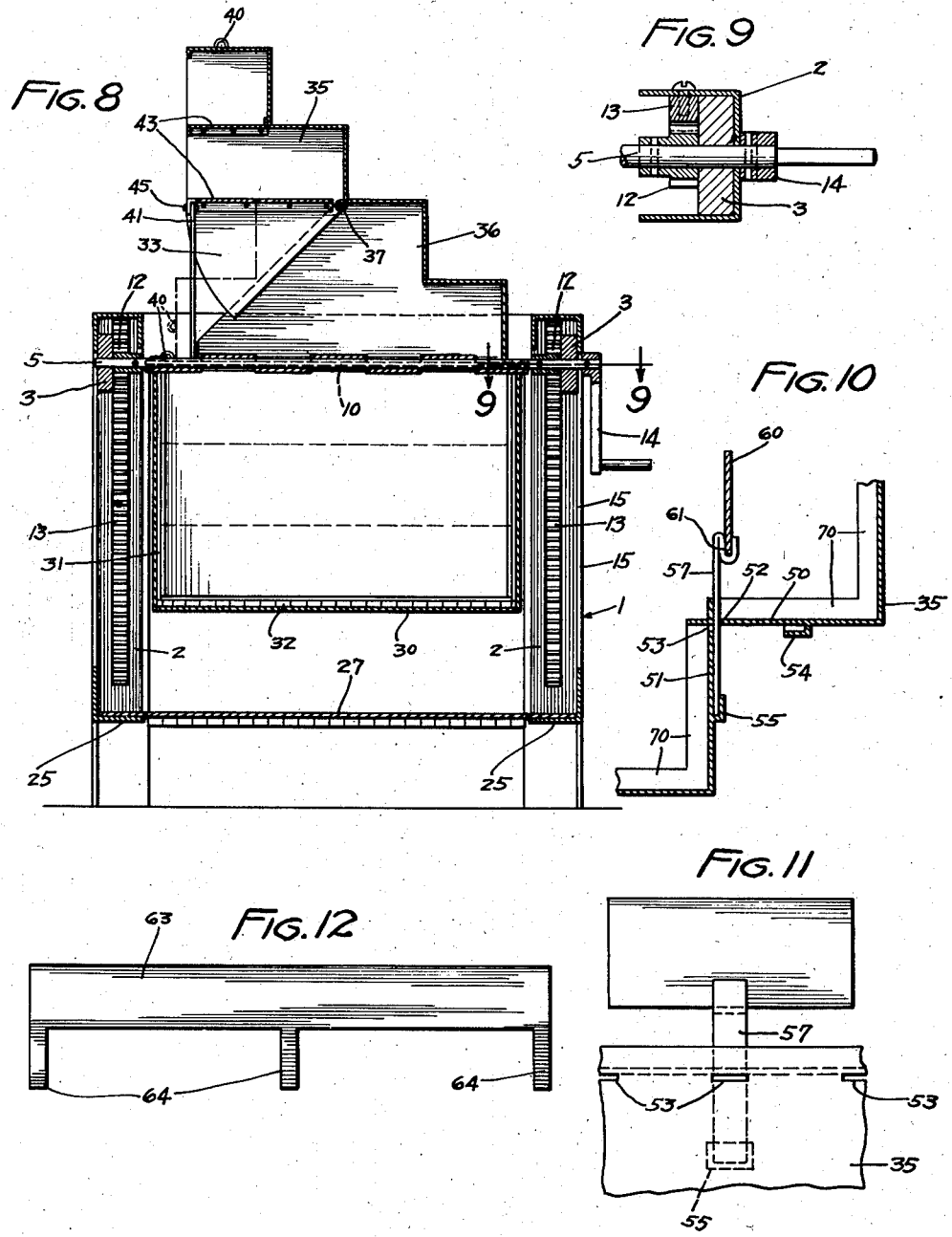
Inventor
HERBERT B. HYAMS
By Paul, Paul & Moore
ATTORNEYS Patented Feb. 12, 1935

1,991,217

UNITED STATES PATENT OFFICE 1,991,217

GOODS-DISPLAY DEVICE

Herbert B. Hyams, St. Paul, Minn.

Application June 22, 1931, Serial No. 546,079

18 Claims. (Cl. 211—2)

This invention relates to improvements in goods-display devices, and has among its objects to provide a table-like display apparatus which is adapted for supporting goods for view from one direction when the device is placed against a wall, and which is adapted to support goods to be viewed from different directions when the device is placed in the middle of the floor space where persons can walk around it.

Another object is to provide an open frame, and to provide a goods-display support which is adapted to swing within the open frame and be raised or lowered therewithin, and to further provide on each of two opposite sides of the support, goods-display structures which can be alternately brought to goods-display position, and either of which structures can act as a storage and goods-display means when the movable support is lowered to a point within the frame.

Another object is to provide step-like supports and to arrange them in stile-like formation, and to hinge one of the stair-like supports to the other so that it may be extended to cooperate with the other to form a single longer flight of steps.

Another object is to provide means for receiving a card holder and operatively positioning it, and to provide means whereby the card holder may be properly operatively positioned and held, either when the hinged stair section is raised or lowered.

Features of the invention include the support medially pivoted for reversibility within the frame along with means for raising and lowering it; the provision of goods-display means at opposite sides of the support; the provision of stair sections arrangeable in stile-like formation; the arrangement of the steps to extend longitudinally and transversely respectively at opposite sides of the support; the provision of a foldable goods support, and means adapting it to be used either at the top or bottom of the frame; and a slot and socket, or equivalent, structure on the steps, for operatively securing a display card holder.

Objects, advantages and features of the invention will be pointed out in the description of the drawings forming part of this application, and in said drawings;

Figure 5 is a vertical longitudinal section corresponding to Figure 2, but with the hinged display stair section raised;

Figure 6 is a top plan of Figure 2;

Figure 7 is a vertical transverse section of line 7—7 of Figure 5 illustrating the means for securing the support against swinging motion;

Figure 8 is a medial vertical transverse section corresponding to Figure 4 but with the hinged stair section raised;

Figure 9 is a detail plan section, on line 9—9 of Figure 8 illustrating the means for raising and lowering the display section support;

Figure 10 is a detail vertical section illustrating the means for attaching a display card holder;

Figure 11 is a front view of Figure 10; and,

Figure 12 is a face view of a modified form of card holder, which may extend the full length of the step or shelf.

Figure 1:
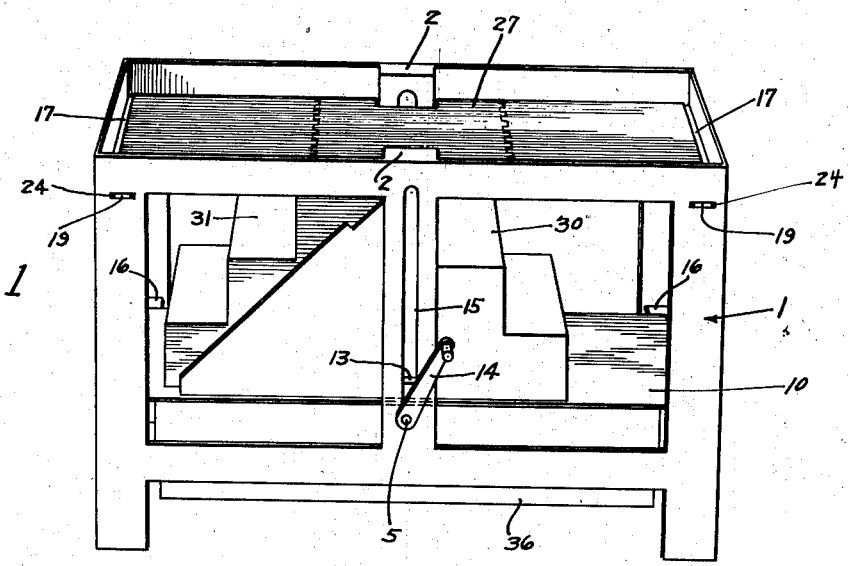
Figure 1 is a perspective view showing both goods-supporting means disposed within and below the level of the top of the frame for storage use, and with a substitute foldable shelf, disposed to act as a goods-display support.

Numeral 1 generally indicates an elongated open table-like frame. Arranged medially of the long dimension of the frame, for vertical motion in guide boxes 2, are mounts 3, see Figures 8 and 9. Journaled in the mounts is a shaft 5 and upon this shaft is pivotally mounted a plate-like support 10. This support is adapted to be swung to alternately, upwardly face its two opposite sides of greatest area. Gears 12 are pinned to the shaft 5 and cooperate with vertical racks 13, one arranged in each of the boxings, as best shown in Figure 8. By means of a crank 14 the shaft is rotated and the mounts 3 and support 10 are raised or lowered. The shaft 5 traverses and rides in vertical slot 15. The support 10 is substantially of the same horizontal area as the inside of the frame, and means has just been described adapting the support to swing and be raised and lowered, within the frame.

Upper and lower ledge-forming means are also provided, adapted to be alternately engaged by the support 10. These ledge means are respectively indicated at 16 and 17, see Figure 5. Each ledge means consists of two horizontally arranged elements, a pair adjacent the bottom and a pair adjacent the top of the frame. The lower pair 16 are fixed and are engaged by the support 10 when the parts are positioned as shown in Figure 1. The upper pair of ledge-formers are hinged, as at 18, so that they may be moved to the dotted line position shown, to permit the support 10 to be swung, or to be lowered. Manually operable means are provided for latching each ledge former, in operative position, one construction for accomplishing this purpose being shown in Figure 7. It consists of longitudinally slotted elements 19 secured to one face of the element 17. The slots are indicated 20, and headed pins 21 pass through the slots and are securely attached to the element 17. Finger pieces 22 are provided and a spring 23 acting against the finger pieces urges elements 19 in opposite direction so that their ends engage in openings 24 of the frame. By moving the elements 22 toward one another the elements 19 are disengaged from the openings 24.

Additional pairs of ledge formers are shown at 25 and 26, see Figures 6 and 8. These extend longitudinally rather than transversely of the frame. They are adapted to receive a foldable shelf 27 composed in this instance of three hinged-together sections, the hinging axis extending transversely. The relative dimensions of the sections are such that when folded they may be passed inwardly through the side or end openings 28, and can then be unfolded to assume the position shown in Figures 2, 3, 4 and 8, whereat the shelf is supported by elements 25. This is a feature. This shelf 27 is also adapted to be supported on elements 26 at the top of the frame, see Figure 6, when the support 10 is positioned as shown in Figure 1. These supports 26 extend longitudinally, in the same direction as the supports 25. These upper supports extend longitudinally and from opposite sides of the boxings 2. The upper surfaces of the element 26 and 10, are substantially coplanar, when 10 is resting on 17. In Figure 6 the ledge formers 17 are also shown. The element 27, its construction and adaptability are features of this invention. This shelf can be used both for storage and display, when respectively placed at the bottom or top of the frame.

Another important feature of the invention relates to the arrangement of goods-display structures at each of two opposite face sides of the support 10. Shelves adapted to support goods at different display levels are provided, the shelves being of such dimensions as to permit pivotal motion of the support 10 to alternately bring respective shelves to display position. The shelf structures have a stair-like and hollow formation, and a feature of the invention is their arrangement in stile-like formation.

Figure 2:
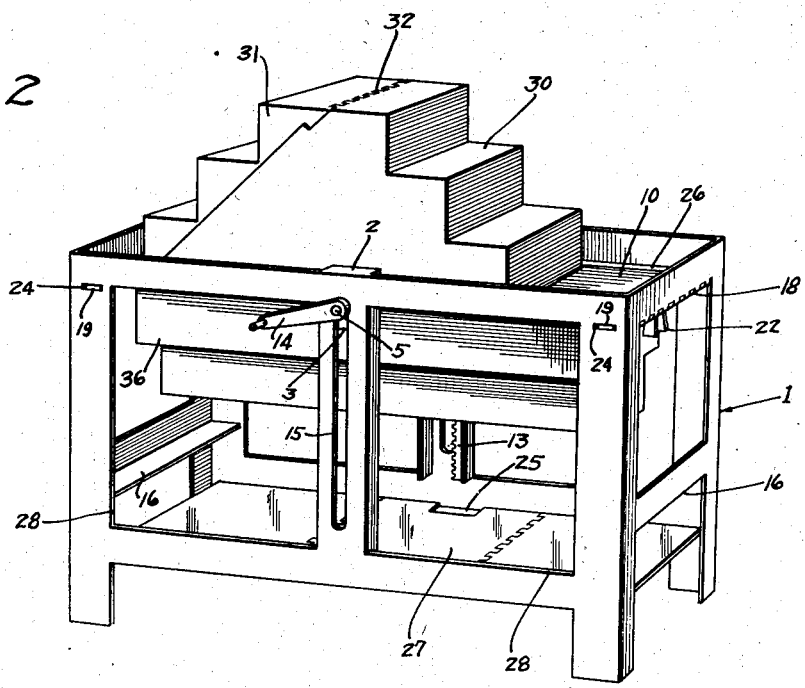
Figure 2 is a perspective view showing the pivoted support raised, and with one of the display devices in goods-display position, and with the substitute shelf arranged at the bottom of the frame as a goods-storage support.
Figure 3:
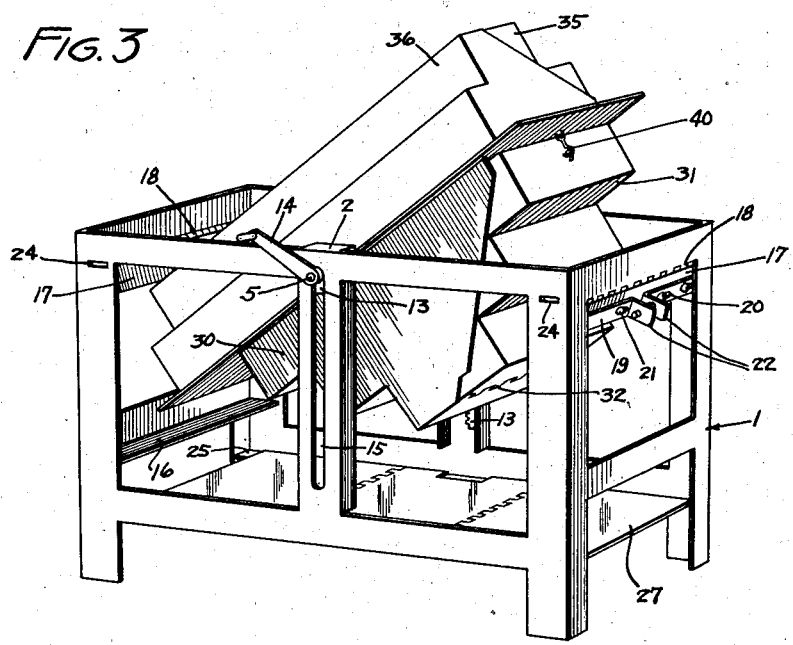
Figure 3 is a perspective view showing the pivoted support, as during swinging adjustment with the substitute shelf arranged in goods-storage position.

Another important feature relates to the sectional construction. First referring to Figures 2, 5 and 6: On one face side of the support 10 are arranged two hollow stair sections, one a stationary section indicated at 30, and the other a movable section generally indicated at 31, and hingedly connected as at 32 to the top of the section 30. The stair sections are so hinged that the section 31 can be disposed to cooperate with the section 30 to form a single longer flight of steps, as shown in Figure 5. The section 31 has segmental plates 33, cooperable with the inner vertical faces of the section 30, to form a continuous wall. In Figure 2 it will be noted that the steps extend transversely of the frame and face toward opposite ends of the frame. In Figure 5 the steps all face toward one and the same end of the frame. This hinged-section arrangement is of particular advantage, because when the frame is so positioned that buyers can pass around it, the steps can be correspondingly arranged in stile-like formation so that goods can be viewed from opposite ends. However, in cases where it is necessary to place one end of the table against a wall, the stair section 31 can be brought to the position shown in Figure 5, so that goods can be viewed from one end.

Another feature of the invention relates to the provision on each of two opposite face sides of a support shelf sections, respectively extending transversely, and longitudinally of the table. In this instance it is to be noted that the steps of one pair are angularly related to the steps of the other, and that one set of stairs is parallel with the short side of the table, and the other parallel with the long side.

Figure 4:
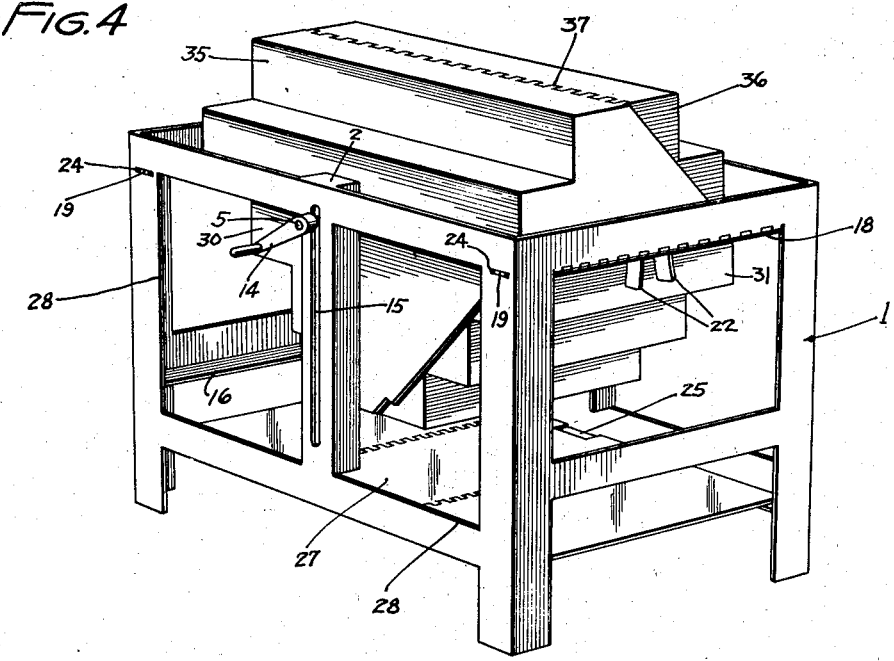
Figure 4 is a perspective view showing the longitudinally extending step-like shelves, arranged in stile-like display position.

Now referring to Figures 4 and 8, a longitudinally extending section 35 is fixed to the opposite side of support 10 and a section 36 is hinged to it, as at 37. These sections are also hollow and the construction is substantially the same as the first mentioned sections. Segmental plates 33 are also provided for section 35. The movable sections are held in stile forming position by means of hooks and eyes 40, see Figure 3. The sections are held in long flight forming position by means of pivoted legs 41, see Figure 8. Any suitable devices may be used for securing the movable shelf elements in their alternate positions.

Another feature of the invention is the provision of shelves 43 within the sections 31, 35. These shelves are adapted to assume a substantially horizontal position when the corresponding section is raised to form a longer flight of steps as shown in Figures 5 and 8. The lowermost shelf provides an attaching point for the pivoted elements 41, and in this instance this lower shelf is provided at its outer edge with a down turned flange to which this attachment is made as at 45. The elements 41 can thus be swung to a nested position lengthwise of the shelf.

Another feature of the invention relates to construction by which a show card holder can be attached in proper display position to the movable step section, either when raised or lowered. Referring to Figures 10, 11 and 12: Figure 10 is a fragmentary view of a portion of one of the movable sections, for example section 35. Each member 50—51 of one corresponding pair of treads and risers of this section is provided with an opening, the openings being respectively indicated 52—53. There may be a series of these openings aligned lengthwise. Sockets are also provided, one opposed to each corresponding opening and arranged in this instance at the inner side of the step element. These socket elements are respectively indicated 54—55 and are so positioned that a portion of a show card holder 57 can either be disposed in the opening 52 and socket 55, or in the opening 53 and socket 54. Figures 10 and 11 illustrate the position when the step section is arranged, for example, as in Figure 4, but when it is arranged as shown in Figure 8 the show card holder 57 will be arranged in opening 53 and socket 54, so as to be disposed in a vertical position, because at this time the step element 50 will be vertically disposed. The card is indicated at 60, and the upper end of the holder is suitably formed as at 61 to receive the card and frictionally secure it.

In Figure 12, is shown a modification of a card holder which is designed to extend substantially the full length of the shelf. This card holder is generally indicated at 63 and is provided with a series of projections 64, each of which is adapted to pass through a corresponding opening of a series of aligned openings positionally corresponding to the opening 52 and/or 53 to secure it in its operative position. Each opening of this series has opposed thereto a socket element or equivalent device. The card holder has some means, not shown, which corresponds to 61 of Figure 10 to hold the card, or the advertising matter may be applied directly to the surface of element 63. Moreover it is evident that the elements 57 and 60 may be integral. Although the openings 52—53 and sockets 54—55 have not been illustrated except in Figures 10 and 11, it will be understood that this card holder device can be applied to each step. Each step may also have a marginal goods-retaining flange, or flanges, 70.

It will be noted that this device provides means whereby when the goods-display supports are in stile-like formation, goods may be displayed for inspection from opposite ends or sides of the table, and when the hinged section of a display support is raised to the position shown in Figure 5, the supports are so positioned that the goods are viewable from one and the same side of the table. It is also to be noted that the stairs may face either in a direction lengthwise of the table or transversely thereof, so that the table can be disposed on the floor in any position which the store arrangement demands, and yet the display shelves can always be manipulated to face in the proper direction. For example, if the device is placed against a wall the extension is raised as in Figure 5 so that all the available display space is viewable in one direction. On the other hand when the device is arranged so that persons may walk around it the display shelves can be so arranged that goods may be placed for view from both, or all, sides.

I claim as my invention:

1. A display device comprising a frame, a support of a size to be reversibly swung within the frame, mount means adapted to move upwardly and downwardly in the frame, means pivotally attaching said support to said mount means, means to be reversely swung for raising and lowering the mount means, each of two opposite face sides of the support having shelves adapted to support goods at different display levels, and of such dimensions as to permit pivotal motions of the support to alternately bring respective shelves to display position, the shelves at one side of the support being substantially right-angularly related to those of the other side.

2. A display device comprising a frame, a support, means medially pivotally attaching said support to swing in the frame, to a horizontal position, each of two opposite face sides of the support having a pair of stair-like sections adapted to support goods at different display levels, and of such dimensions as to permit pivotal motions of the support to alternately bring respective pairs of sections to display position, said sections being hinged together, so that one can be disposed to cooperate with the other to form a single longer flight of steps, and the steps of one pair being angularly related to the steps of the other.

3. A display device comprising an elongated frame, a support of a size to be moved vertically and to swing within the frame, mount means adapted to move upwardly and downwardly in the frame, means pivotally attaching said support to the mount means, means for raising and lowering the mount means, means for securing the support against swinging motion when in an upper position, each of two opposite face sides of the support having a pair of hollow substantially stair-like sections, the treads of which are adapted to act as shelves when the support is in horizontal position, one of the sections being hingedly connected to the other and being adapted to swing upwardly to a position to cooperate to produce a single and long flight of steps, and means for securing the sections in the last mentioned extended position, the risers of respective groups being faced at angles to one another.

4. A display device comprising a frame having ledge forming means respectively adjacent its top and bottom, mounts adapted for vertical adjustment medially of the frame, and between the ledge-forming means, a support medially pivoted to said mounts and adapted to be alternately engaged with and horizontally supported by said ledge-forming means, each of two opposite face sides of said support having means thereon adapted to hold goods for display, said last mentioned means being of such size as to permit swinging motion of said support within the frame, means for raising and lowering the mounts, and a shelf adapted to be supported by the ledge-forming means.

5. A device of the class described comprising a stair-like goods-display section one of the treads having an opening and the corresponding riser having a socket opposed to the opening, whereby a portion of an article-supporting standard may traverse the opening and engage the socket to secure the standard in operative position.

6. A device of the class described comprising a pair of stair-like sections, one section being hinged to the other and being adapted to be swung to cooperate with the other section to form a long flight of stairs, one of the risers having an opening and the corresponding tread having a socket opposed to the opening, and said tread having an opening and said riser having a socket opposed to the opening, whereby a portion of an article-supporting standard can traverse either opening and engage the corresponding socket in a manner to be held in operative position.

7. A device of the class described comprising an elongated frame having a support of substantially the same horizontal area as the frame, means for mounting the support to swing within the frame, said support having at opposite sides, shelves which respectively extend longitudinally and transversely of the frame.

8. A device of the class described comprising a pair of stair-like sections so hinged together as to assume a stair-like relation, one of the sections being adapted to be swung to cooperate with the other to form a long flight of steps, the riser and tread portions of said swingable section having openings adjacent their outermost meeting points and each having a socket opposed to a corresponding opening, whereby a portion of an article-supporting standard can traverse any opening and engage a corresponding socket to be held in operative position.

9. A device of the class described comprising a pair of hollow stair-like sections so hinged together as to assume a stair-like relation, one of the sections being adapted to be swung to cooperate with the other to form a long flight of steps, the riser and tread portion of said swingable section having openings adjacent their outermost meeting points and each having a socket at its inner edge opposed to the corresponding opening whereby a portion of an article-supporting standard can traverse any opening and engage the corresponding socket for holding the standard in operative position.

10. A display device comprising a housing frame, a plate-like support medially pivoted to be reversely swung within the housing, each of two opposite face sides of the support having a pair of substantially stair-like sections arranged as a stile, one of the sections being hingedly connected to the other and being adapted to swing upwardly to a position to cooperate to produce a single long flight of steps, and means for securing the sections in the last mentioned extended position.

11. A display device comprising a frame, a support of a size to be reversibly swung within the frame, mount means adapted to move upwardly and downwardly in the frame, means pivotally attaching said support to said mount means to be reversely swung, means for raising and lowering the mount means, said support having on one face goods display means of such dimensions as to permit reversing motions of the support to alternately bring respective faces to display position, and means adapted to act as a shelf below the pivoted support when it is in raised position with one of its faces uppermost, and to act as a table top for the frame when the support is lowered, said frame having ledges which support the table top and shelf member in respective positions.

12. A display device comprising a tubular frame, mount means vertically adjustable within the frame, a support arranged to be reversely swung upon the mount partly within the housing, each of two opposite face sides of the support having a goods-supporting structure connected thereto and extending outwardly therefrom, and means accessible from the outside of the housing frame for raising and lowering the mount.

13. A display device comprising an open top tubular frame, a plate-like support providing opposite table-forming faces, means pivotally attaching the support within the frame in a manner to be reversely moved to close the top of the frame, one face of the support having a goods-display structure for supporting goods at different levels and adapted to be received within the frame when the support is reversed.

14. A display device comprising a frame, a support pivotally attached to the frame to be reversely swung, each of two opposite face sides of the support having stair-like shelves adapted to support goods at different display levels, the shelves at one side being angularly related to those of the other, and the stair-like structure being hollow so that goods may be supported on the steps on one side and goods may be stored within the structure at the opposite side.

15. A hollow frame having therein a mount and means for vertically adjusting it, a shelf pivoted to said mount to be reversibly swung, ledges adjustable to assume shelf-supporting and non-shelf-supporting positions, said shelf being of a size to be supported by said ledges when in supporting position, but adapted when the ledges are in non-supporting position to be swung within the frame, one face of the shelf being adapted to act as a table top for the frame and the opposite face having thereon goods-supporting shelves, and the dimensions of said frame being such that the shelves can be housed therewithin at a level below the ledges, with said shelf resting on said ledges.

16. A display device comprising a hollow table-like frame, a plate-like support pivoted within the frame below its upper level to be reversibly swung, each of two opposite face sides of the support having a stair-like goods-display structure connected thereto.

17. A display device comprising a tubular housing frame, a mount vertically adjustable upon and within the frame, a support arranged to be reversibly swung upon the mount and within the frame, each of the two opposite face sides of the support having a stair-like goods-supporting structure connected thereto and of such dimensions as to permit reverse swinging of the support and means for raising and lowering the mount to move the support and its two structures below the top of the hollow frame.

18. A display device comprising a hollow frame, a support within the frame and means connecting it to the frame for vertical and swinging motions within the frame, mount means adapted to move upwardly and downwardly within the frame, means pivotally attaching said support to said mount means, and means for raising and lowering the mount means including stationary racks and gears journaled in the support, each of the two opposite face sides of the support having goods-supporting means thereon of such dimensions as to permit the support to be reversely swung within the frame to permit bringing said display means to display position.

HERBERT B. HYAMS.